United States Patent [19]

Hull, Jr. et al.

[11] 3,893,640
[45] July 8, 1975

[54] SOUND SUPPRESSING NACELLE ARRANGEMENT

[75] Inventors: Thomas Neil Hull, Jr., Marblehead; Denis Pierpont Edkins, Lynnfield, both of Mass.

[73] Assignee: General Electric Company, Lynn, Mass.

[22] Filed: Nov. 27, 1973

[21] Appl. No.: 419,264

[52] U.S. Cl. ............ 244/54; 181/33 E; 181/33 HB; 239/265.13; 244/1 N
[51] Int. Cl. ............................................ B64d 27/00
[58] Field of Search ......... 181/33 E, 33 HB, 33 HC, 181/33 HD; 239/265.13, 265.19, 265.33, 265.35, 265.39, 265.41; 244/54, 55, 12 CW, 1 N

[56] References Cited
UNITED STATES PATENTS 3,767,120  10/1973  Harmon .................. 239/265.39
3,791,586  2/1974  Moorehead ............... 239/265.29

FOREIGN PATENTS OR APPLICATIONS 1,019,857  2/1966  United Kingdom .......... 181/33 E
702,290  3/1966  Italy ........................ 244/52

*Primary Examiner*—Richard B. Wilkinson
*Assistant Examiner*—John F. Gonzales
*Attorney, Agent, or Firm*—James W. Johnson, Jr.; Derek P. Lawrence

[57] ABSTRACT

A sound suppressing nacelle arrangement is provided for an airplane gas turbine engine wherein the nacelle is mounted over the wing of the airplane and an aft exhaust duct is made translatable therewith for telescoping engagement within the nacelle in order to expose a portion of the overlying wing surface which functions as a sound reflection shield at those altitudes where the noise levels of the engine and exhausting jet stream are not substantially attenuated before reaching ground.

7 Claims, 5 Drawing Figures

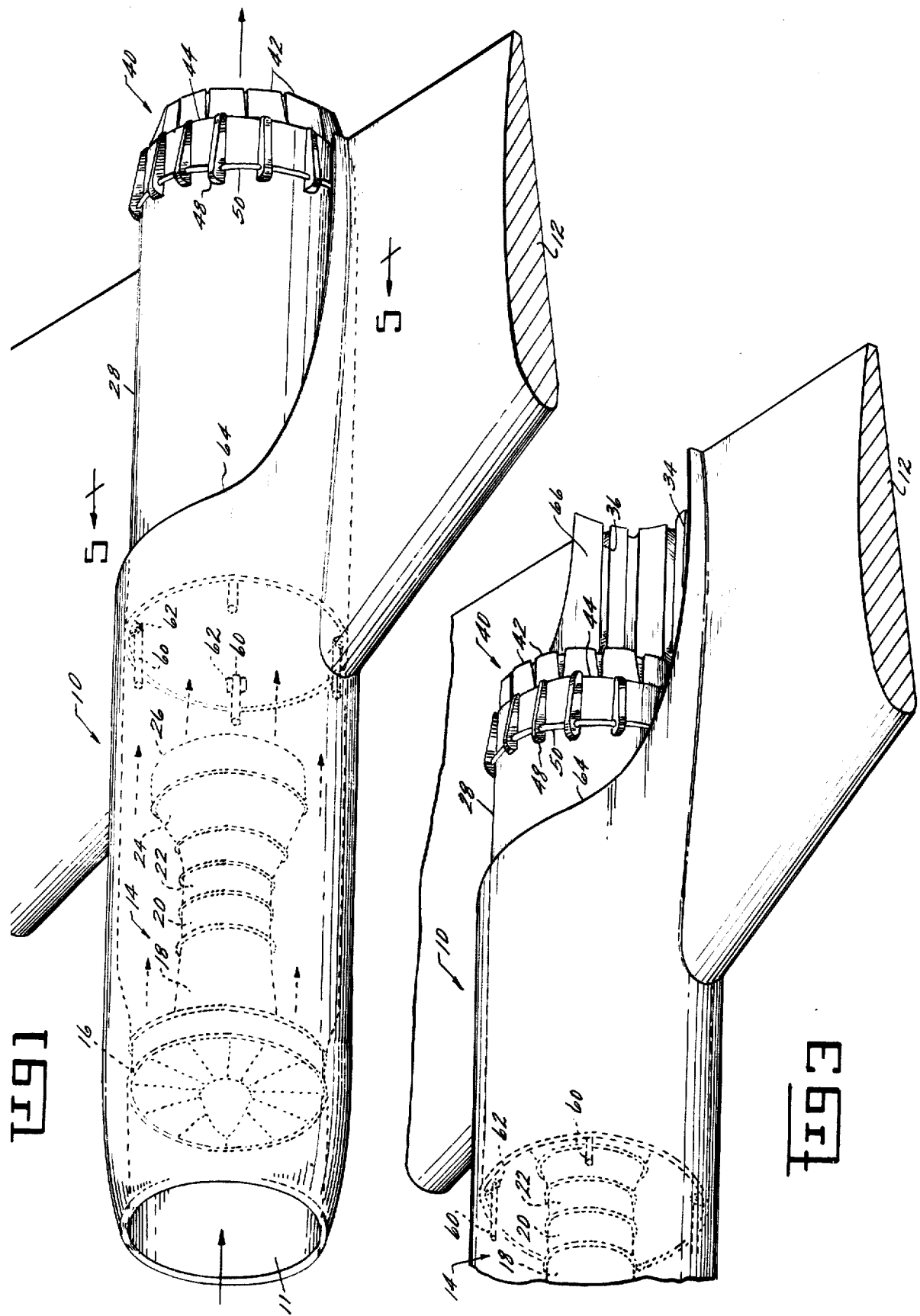

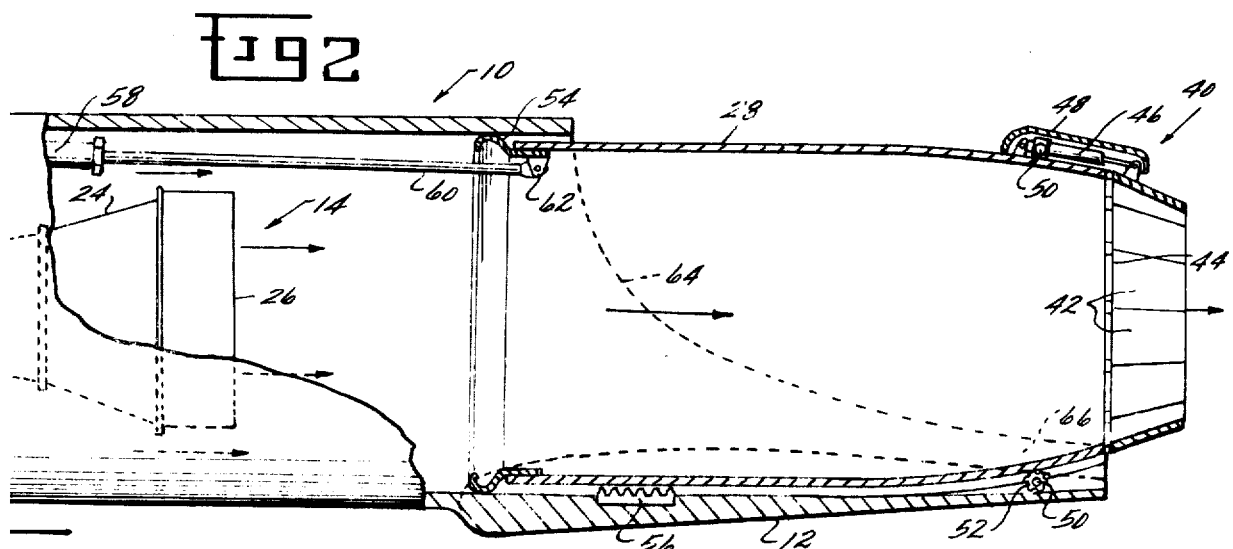
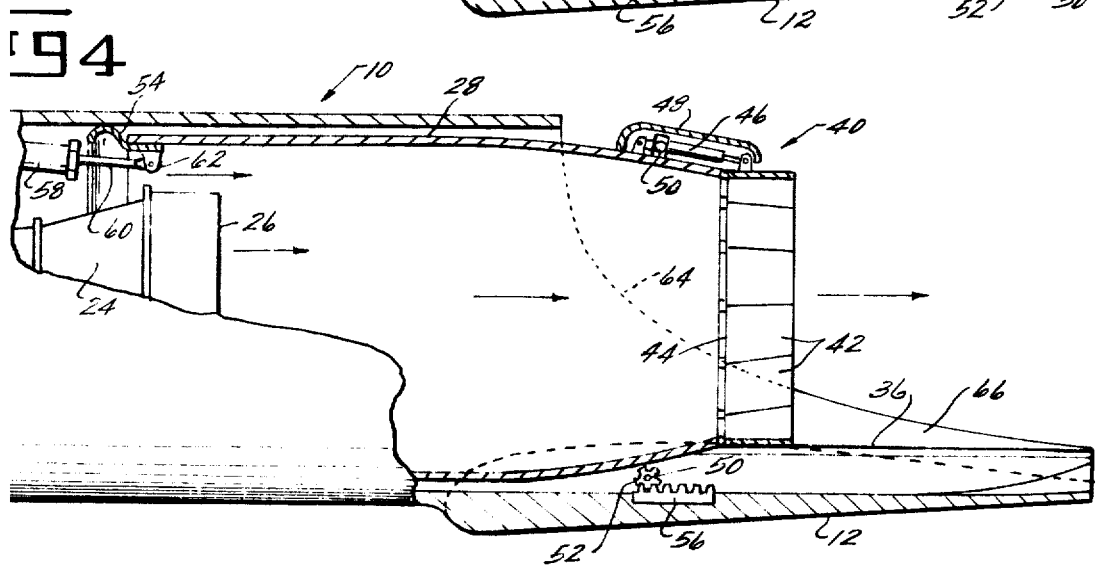
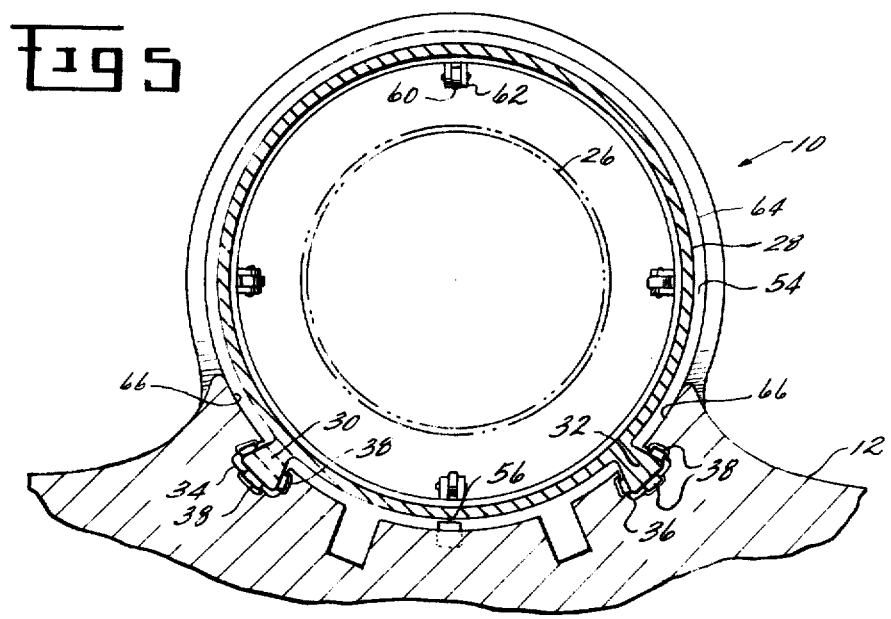

SOUND SUPPRESSING NACELLE ARRANGEMENT

BACKGROUND OF THE INVENTION

In general, this invention relates to a sound suppressing nacelle arrangement and, more particularly, to a sound suppressing nacelle arrangement around a gas turbine engine for propulsion of an airplane.

A gas turbine or jet engine produces a reaction thrust by ejecting a high velocity stream of gas from an exhaust nozzle or tailpipe. Airplanes equipped with jet engines produce a high level of sound energy or noise in a wide range of frequencies. This noise emanates mainly from the inlet and exhaust of the jet engine with additional noise generated by the exhaust stream impinging upon the atmosphere. The noise emitted from the inlet and exhaust is composed of sound energy from the rotating machinery and combustor as well as internal air turbulences. A portion of this noise reaches the ground from low flying airplanes as during takeoff, climb and landing, at an energy level which is not acceptable to the public. The problem of aircraft engine noise and its disturbing effect upon people residing in the vicinity of airports has become so acute as of late that the Federal Aviation Agency has established noise level standards which will have to be met by aircraft and gas turbine engine manufacturers before an aircraft powered by a gas turbine engine can be certified.

It has been determined that sound waves are emitted substantially radially outward from the cone of noise produced by the engine generated internal noise together with the exiting jet exhaust stream, so that only the lower half of the cone produces the objectionable ground directed noise. Thus it has been suggested to utilize concave shields which translate rearwardly of the engine exhaust duct and reflect the objectionable lower half of the ground directed noise cone. However, such translating shield arrangements have proved to be of a complex nature materially adding to the overall weight of the engine nacelle.

Therefore, it is a primary object of this invention to provide a simplified sound suppressing nacelle arrangement for an airplane gas turbine engine.

It is a further object of this invention to provide a sound suppressing nacelle arrangement wherein the nacelle is mounted over the wing of an airplane so as to utilize a portion of the overlying wing surface as a sound reflecting shield in place of a translatable shield.

It is another object of this invention to provide a sound suppressing nacelle arrangement wherein a portion of the nacelle may be telescopically translated over the wing of an airplane so as to expose a portion of the overlying wing surface only at altitudes where the noise levels are not substantially attenuated before reaching ground.

SUMMARY OF THE INVENTION

These and other objects and advantages will become clearly understood from the following detailed description and drawings, all of which are intended to be representative of, rather than in any way limiting on, the scope of invention. A sound suppressing nacelle arrangement which houses a gas turbine engine for propulsion of a winged aircraft includes a nacelle mounted over the wing. The nacelle includes an opening at the upstream end thereof for receipt of an inlet airflow to the gas turbine engine. An exhaust duct is translatably disposed in serial flow relation downstream of the nacelle for telescoping engagement within the nacelle. The exhaust duct may be translated forwardly over the wing exposing a portion of the surface overlying the wing which operates as a sound reflecting shield.

BRIEF DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a perspective view, partly in cross-section, of the sound suppressing nacelle arrangement of this invention.

FIG. 2 is a side view, partly in cross-section, of the sound suppressing nacelle arrangement of FIG. 1.

FIG. 3 is a perspective view, partly in cross-section, showing a different mode of operation for the sound suppressing nacelle arrangement of FIG. 1.

FIG. 4 is a side view, partly in cross-section, of the sound suppressing nacelle arrangement of FIG. 3.

FIG. 5 is an enlarged cross-sectional view taken along the line 5—5 of FIG. 1.

DESCRIPTION OF THE PREFERRED EMBODIMENT

Referring to FIG. 1, there is shown a nacelle or housing 10 mounted over a wing 12 of an aircraft. The upstream end of the nacelle 10 is open to provide an inlet 11 for the receipt of an inlet airflow which is directed to a gas turbine engine 14. The gas turbine engine 14 is illustrated as being of the turbofan type, although other types of gas turbine engines such as a straight turbojet or turboshaft would also be suitable for inclusion within the nacelle 10. The turbofan engine 14 is illustrated as including an upstream fan 16, a compressor 18, a combustor 20, a high pressure turbine 22, a low pressure turbine 24, and a core exhaust 26, all of which are arranged in serial flow relation.

Downstream of the nacelle 10, there is disposed in serial flow relation a translating cylindrical exhaust duct 28 for telescoping engagement within the nacelle 10. The exhaust duct 28 is maintained for translation with respect to the nacelle 10 by a pair of elongated, generally axially extending dovetail rails 30, 32 which respectively engage elongated, generally axially extending dovetail channels 34, 36 in the nacelle 10, as may be best viewed in the cross-section of FIG. 5. Sliding engagement between the dovetail rails 30, 32 and the dovetail channels 34, 36 may be facilitated by roller bearings 38 which are disposed in sets at axially spaced apart locations along the longitudinal length of the dovetail channels 34, 36.

The downstream end of the translating exhaust duct 28 terminates in a variable exhaust nozzle 40 comprising a plurality of circumferentially spaced apart flaps 42 rotatably hinged at 44 to the downstream transverse edge of the exhaust duct 28. Referring now to FIGS. 2 and 4, it can be seen that rotation of the flaps 42 about the downstream edge of the exhaust duct 28 is controlled by a plurality of circumferentially spaced apart screw type actuators 46, each one of which interconnects between the exhaust duct 28 and a respective rotatable flap 42. Each screw type actuator 46 is housed within an outer fairing 48 so as to minimize the disturbance of the aerodynamic flow around the actuators 46. Simultaneous actuation of all the screw type actuators 46 is accomplished by rotating a flexible circumferential drive shaft 50 which extends around the exhaust duct 28 into driving engagement with all the actuators 46. The drive shaft 50 in turn is rotated through a pinion gear 52, the teeth of which engage the teeth of a stationary rack 56 in a manner to be more fully described in the following discussion. The actuators 46 are of the mechanical type which will hold the position of the flaps 42 after the pinion gear 52 disengages from the stationary rack 56. The upstream edge of the exhaust duct 28 telescopes within the nacelle 10 and is sealingly engaged to the interior surface of the nacelle 10 by a flexible circumferential seal 54.

Translation of the exhaust duct 28 relative to the nacelle 10 is controlled by an actuator 58 which may be either of a hydraulic or mechanical type as is well known in the art. The actuator 58 is maintained in fixed connection relative to the nacelle 10 and includes a drive rod 60 extending therefrom into connection with the exhaust duct 28 at a clevis 62. As is readily apparent, the trailing edge of the nacelle 10, as shown at 64, is gradually tapered rearward so as to define an elongated, trough-like, over the wing surface 66 which functions as a concave sound reflecting shield in a manner to become obvious from the following discussion.

As previously discussed, it is well known in the art that sound waves are emitted substantially radially outward from the cone of noise produced by the engine generated internal noise together with the high velocity stream of gas emanating from the exhaust nozzle. As is readily apparent, it is only the lower half of the cone of noise which produces the objectionable ground directed noise. Thus it has been suggested to utilize concave shields which translate rearwardly of the engine exhaust duct and reflect the objectionable lower half of the ground directed noise cone. Such translating shield arrangements, however, have proven to be of a complex nature materially adding to the overall weight of the engine nacelle. The translating exhaust duct system of this invention, however, provides an effective and simple sound reflecting shield by mounting a nacelle over the wing of an aircraft and then utilizing a portion of the nacelle surface overlying the wing as a sound reflecting shield.

Referring now to FIGS. 3 and 4, there is shown the position of the translating exhaust duct 28 normally assumed during takeoff or landing when ground directed noise is most objectionable. The drive rod 60 of the actuator 58 is moved to its retracted position so as to translate the exhaust duct 28 into telescoping engagement within the nacelle 10. The actuator 58 may be actuated through either a pilot initiated control signal or an automatic control signal. As is readily apparent, translating the exhaust duct 28 forward exposes the elongated trough-like shield surface 66 which operates to intercept the sound energy emanating from the engine exhaust duct 28. The sound energy which travels downwardly and laterally from the exhaust duct 28 is consequently reflected upward and away from ground level.

It will be further appreciated that upstream translation of the exhaust duct 28 operates to engage the teeth of the pinion gear 52 with the teeth of the rack 56 such that the pinion gear and its associated flexible drive shaft 50 are rotated in a manner which actuates the screw type actuators 46. Upon actuation, the screw type actuators 48 operate to pivot the flaps 42 radially outward so as to increase the exit area of the variable exhaust nozzle 40. In this manner, the velocity of the propulsive jet stream exiting through the variable nozzle 40 may be reduced during takeoff and landing.

Referring now to FIGS. 1 and 2, there is shown the mode of operation as utilized for cruising flight where the sound energy of the jet stream or streams is attenuated before reaching ground level. The trough-like shield surface 66 is no longer necessary to reflect ground directed noise and hence may be overlapped by the exhaust duct 28 which is translated rearwardly by the actuator 58. Rearward translation of the exhaust duct 28 during normal cruise also operates to reduce the overall aerodynamic drag which would otherwise be increased by the boundary layer of the discharging jet stream attaching to the shield surface 66. In this manner, effective noise suppression may be provide for a gas turbine engine in a simple and effective manner without the use of translating shields and their associated complex sliding and actuating machanisms.

Accordingly, while the preferred embodiment in a preferred application of the present invention has been depicted and described, it will be appreciated by those skilled in the art that many modifications, substitutions and changes may be made thereto without departing from the invention's fundamental theme. For example, the trailing edge 64 of the nacelle 10 need not be tapered in the described manner but instead may be in a plane directly perpendicular to the longitudinal axis of the nacelle in which case the shield surface 16 would conform directly to the contour of the aircraft wing.

Therefore, having described the preferred embodiment of the invention, what is desired to be secured by Letters Patent is as follows.

What is claimed is:

1. A sound suppressing nacelle arrangement housing a gas turbine engine for propulsion of a winged aircraft comprises:

a nacelle mounted over the wing of the aircraft with an opening at the upstream end thereof for receipt of an inlet airflow to the gas turbine engine, said wing including a trough-like surface;

an exhaust duct translatably disposed in serial flow relation downstream of the nacelle for telescoping engagement within the nacelle, and means for translating the exhaust duct forwardly over the wing to expose rearwardly of the exhaust duct a portion of the nacelle overlying said trough-like surface of the wing, said trough-like surface operating as a sound reflecting shield when said exhaust duct is in its forward position.

2. The sound suppressing nacelle arrangement of claim 1 wherein the downstream end of the translating exhaust duct terminates in a variable exhaust nozzle comprising:

a plurality of circumferentially spaced apart flaps rotatably hinged to the downstream edge of the exhaust duct;

a plurality of circumferentially spaced apart actuators each one of which interconnects between the exhaust duct and a respective rotatable flap;

flexible circumferential drive shaft extending around the exhaust duct into driving engagement with all the actuators;

a pinion gear in fixed connection to the drive shaft, and a rack maintained in fixed relation relative to the nacelle such that upstream translation of the exhaust duct results in the teeth of the pinion gear engaging the teeth of the rack so as to rotate the pinion gear and its associated drive shaft and simultaneously actuate the actuators which pivot the flaps radially outward increasing the exit area of the variable exhaust nozzle.

3. The sound suppressing nacelle arrangement of claim 2 wherein each actuator is of the screw type housed within an outer fairing so as to minimize the disturbance of the aerodynamic flow around the actuators.

4. The sound suppressing nacelle arrangement of claim 1 wherein the trailing edge of the nacelle gradually tapers rearwardly so as to define an elongated trough-like surface over the wing, said surface functioning as a concave sound reflecting shield during upstream translation of the exhaust duct into telescoping engagement within the nacelle.

5. The sound suppressing nacelle arrangement of claim 1 and further including:
   a pair of elongated dovetail channels, extending generally axially in the nacelle in the portion overlying the wing;
   a pair of elongated dovetail rails, extending generally axially along the exhaust duct, each of said rails slidably engaging a corresponding dovetail channel for translation of the exhaust duct with respect to the nacelle;
   roller bearings, disposed in sets at axially spaced locations along the length of the channels to facilitate sliding engagement between the rails and the channels;
   an actuator for controlling translation of the exhaust duct, one end of said actuator being maintained in fixed connection relative to the nacelle and the other end thereof being connected to the exhaust duct.

6. A sound suppressing nacelle arrangement housing a gas turbine engine for propulsion of a winged aircraft comprises:
   a nacelle mounted over the wing of the aircraft having an opening at the upstream end thereof for receipt of an inlet airflow to the gas turbine engine with the downstream edge thereof tapering rearwardly so as to define an elongated trough-like surface over the wing, said surface functioning as a concave sound reflecting shield;
   an exhaust duct translatably disposed in serial flow relation downstream of the nacelle whereby the exhaust duct may be translated forwardly over the wing exposing the concave sound reflecting shield, and
   a variable exhaust nozzle at the downstream end of the translating exhaust duct comprising: a plurality of circumferentially spaced apart flaps rotatably hinged to the downstream edge of the exhaust duct, a plurality of circumferentially spaced apart actuators each one of which interconnects between the exhaust duct and a respective rotatable flap, a flexible circumferential drive shaft extending around the exhaust duct into driving engagement with all the actuators, a pinion gear in fixed connection to the drive shaft, and a rack maintained in fixed relation relative to the nacelle such that upstream translation of the exhaust duct results in the teeth of the pinion gear engaging the teeth of the rack so as to rotate the pinion gear and its associated drive shaft and simultaneously actuate the actuators which pivot the flaps radially outward increasing the exit area of the variable exhaust nozzle.

7. The sound suppressing nacelle arrangement of claim 6 wherein: the exhaust duct is maintained for translation with respect to the nacelle by a pair of elongated, generally axially extending rails from the exhaust duct which respectively engage elongated, generally axially extending dovetail channels in the nacelle with sliding engagement between the dovetail rails and dovetail channels facilitated by roller bearings disposed in sets at axially spaced apart locations along the longitudinal length of the dovetail channels and translation of the exhaust duct is controlled by an actuator, one end of which is maintained in fixed connection relative to the nacelle with the other end thereof connecting to the exhaust duct.

* * * * *